United States Patent
Kupratis et al.

(10) Patent No.: US 11,639,690 B1
(45) Date of Patent: May 2, 2023

(54) BOOST SPOOL FLOW CONTROL AND GENERATOR LOAD MATCHING VIA LOAD COMPRESSOR

(71) Applicant: Raytheon Technologies Corporation, Farmington, CT (US)

(72) Inventors: Daniel B. Kupratis, Wallingford, CT (US); Paul R. Hanrahan, Sedona, AZ (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/662,202

(22) Filed: May 5, 2022

(51) Int. Cl.
| | |
|---|---|
| F02C 7/36 | (2006.01) |
| F02C 6/02 | (2006.01) |
| F02C 6/08 | (2006.01) |
| F02C 9/20 | (2006.01) |
| F02C 9/42 | (2006.01) |
| F02K 3/075 | (2006.01) |
| F02K 3/12 | (2006.01) |
| F02C 9/18 | (2006.01) |
| F02C 7/32 | (2006.01) |
| F02K 3/077 | (2006.01) |

(52) U.S. Cl.
CPC ............... *F02C 9/18* (2013.01); *F02C 6/02* (2013.01); *F02C 6/08* (2013.01); *F02C 7/32* (2013.01); *F02C 7/36* (2013.01); *F02C 9/20* (2013.01); *F02C 9/42* (2013.01); *F02K 3/075* (2013.01); *F02K 3/077* (2013.01); *F02K 3/12* (2013.01)

(58) Field of Classification Search
CPC ...... F02C 7/32; F02C 7/36; F02C 6/02; F02C 6/08; F02C 9/18; F02C 9/20; F02C 9/42; F02K 3/076; F02K 3/077; F02K 3/12; F02K 3/06
See application file for complete search history.

(56) References Cited

U.S. PATENT DOCUMENTS

| | | | |
|---|---|---|---|
| 3,677,012 A | 7/1972 | Batscha | |
| 4,147,024 A * | 4/1979 | Moellmann | F02C 7/10 60/39.15 |
| 5,694,765 A | 12/1997 | Hield et al. | |
| 8,424,280 B2 | 4/2013 | Moore et al. | |
| 10,669,940 B2 | 6/2020 | Snape | |
| 10,914,234 B1 | 2/2021 | O'Flarity et al. | |
| 10,995,673 B2 | 5/2021 | Suciu et al. | |
| 11,143,142 B2 | 10/2021 | Hanrahan et al. | |
| 11,193,425 B2 | 12/2021 | Hanrahan et al. | |
| 11,560,233 B2 | 1/2023 | Dubreuil et al. | |
| 2012/0119020 A1 | 5/2012 | Burns et al. | |
| 2012/0119021 A1 | 5/2012 | Burns et al. | |
| 2012/0216549 A1 | 8/2012 | Burns | |

(Continued)

*Primary Examiner* — William H Rodriguez
(74) *Attorney, Agent, or Firm* — Kinney & Lange, P.A.

(57) ABSTRACT

A gas turbine engine includes a first spool of a primary flow path and a second spool of a secondary flow path. The second spool is nonconcentric with the first spool. The second spool includes a boost compressor and a load compressor in fluid communication with an inlet plenum. An inlet duct assembly and an outlet duct assembly place the secondary flow path in communication with the primary flow path. The gas turbine includes a controller operable to vary open areas of variable inlet guide vanes to control a flow division between the boost compressor and the load compressor.

20 Claims, 5 Drawing Sheets

(56) References Cited

U.S. PATENT DOCUMENTS

| | | | |
|---|---|---|---|
| 2014/0260295 A1* | 9/2014 | Ullyott | F02C 3/113 |
| | | | 60/774 |
| 2016/0053721 A1* | 2/2016 | Fletcher | F02C 9/18 |
| | | | 60/226.3 |
| 2016/0186600 A1 | 6/2016 | Surace | |
| 2017/0113808 A1 | 4/2017 | Bond | |
| 2017/0241336 A1* | 8/2017 | Jones | F01D 15/10 |
| 2017/0248081 A1 | 8/2017 | Roach et al. | |
| 2017/0298826 A1* | 10/2017 | Ryznic | F02C 7/18 |
| 2018/0010476 A1* | 1/2018 | Brostmeyer | F02C 3/10 |
| 2018/0156121 A1 | 6/2018 | Snape et al. | |
| 2019/0063331 A1* | 2/2019 | Beauchesne-Martel | |
| | | | F02C 9/20 |
| 2019/0368417 A1* | 12/2019 | Terwilliger | F02C 9/18 |
| 2020/0032702 A1 | 1/2020 | Kupratis et al. | |
| 2020/0040848 A1 | 2/2020 | Hanrahan et al. | |
| 2020/0386188 A1 | 12/2020 | Kupratis et al. | |
| 2020/0400078 A1 | 12/2020 | Hanrahan et al. | |

* cited by examiner

BOOST SPOOL FLOW CONTROL AND GENERATOR LOAD MATCHING VIA LOAD COMPRESSOR

BACKGROUND

The present disclosure relates generally to gas turbine engines and, more particularly, to gas turbine engines capable of operating in a high overall pressure ratio (OPR) mode and in a low OPR mode to adapt to the ambient conditions and to provide more efficient operation without exceeding thermal limits of the gas turbine engine.

The overall pressure ratio (OPR) is a measure of the total pressure rise in a gas turbine engine (i.e., a pressure ratio equal to the air pressure discharged from the last compressor stage and the ambient air pressure entering the engine). Generally speaking, as OPR increases, the thermodynamic efficiency of the gas turbine engine increases, enabling the engine to consume less fuel per unit of thrust (i.e., thrust specific fuel consumption or TSFC) than a corresponding engine with lower OPR. However, air temperatures within the gas turbine engine increase with increasing OPR and can produce temperatures within the compressor section and/or turbine section that exceed permissible material and structural limits. Furthermore, the maximum temperature within the compressor and the turbine increase as the ambient temperature increases, adding to the temperature increase associated with the OPR of the engine.

Conventionally, turbine temperatures are maintained within acceptable limits by limiting OPR to a ratio that produces acceptable turbine temperatures for worst case ambient conditions, typically, design conditions corresponding to hot day take-off. While this technique produces a gas turbine engine design that provides an acceptable compromise for a variety of operating conditions, limiting OPR for hot day take-off conditions produces a gas turbine engine that operates at less OPR than otherwise possible at cruise power, reducing engine efficiency when high efficiency, low fuel consumption operation is most advantageous to extend aircraft range or payload capacity.

SUMMARY

A gas turbine engine in accordance with an exemplary embodiment of this disclosure includes a first spool and a second spool. The first spool includes a first compressor and a first turbine mounted to a first shaft. The second spool includes a second compressor, a load compressor, and a second turbine mounted to a second shaft. A primary flow path includes the first compressor and the first turbine. A secondary flow path includes the second compressor and the second turbine. A tertiary flow path includes the load compressor. An inlet duct assembly places the primary flow path in communication with an inlet manifold, which communicates with the secondary and tertiary flow paths. An outlet duct assembly places the secondary and tertiary flow paths in communication with the primary flow path between the first compressor and the first turbine.

A gas turbine engine according to a further exemplary embodiment of this disclosure includes a first variable inlet guide vane stage along the secondary flow path between the second compressor and the inlet plenum and a second variable inlet guide vane stage along the tertiary flow path between the load compressor and the inlet plenum.

A gas turbine engine according to a further exemplary embodiment of this disclosure includes a controller operable to vary open areas of the first and second variable guide vane stages based on an engine pressure ratio of the second spool or a differential discharge pressure between the secondary and tertiary flow paths.

DETAILED DESCRIPTION

As described herein, a gas turbine engine has a boost spool that can be selectively operated to increase overall pressure ratio (OPR) during certain engine power levels (e.g., cruise power) while operating the gas turbine engine without the boost spool during other power levels (e.g., takeoff power). In some configurations, the boost spool includes a load compressor having an inlet shared with the boost compressor. With this configuration, a flow division between the boost compressor and the load compressor can be used to increase operating efficiency of the gas turbine engine. Furthermore, the gas turbine engine can operate within thermal limits when ambient temperature limits the OPR and can operate with greater engine efficiency when ambient temperatures are lower and permit higher OPR operation.

Figure 1:
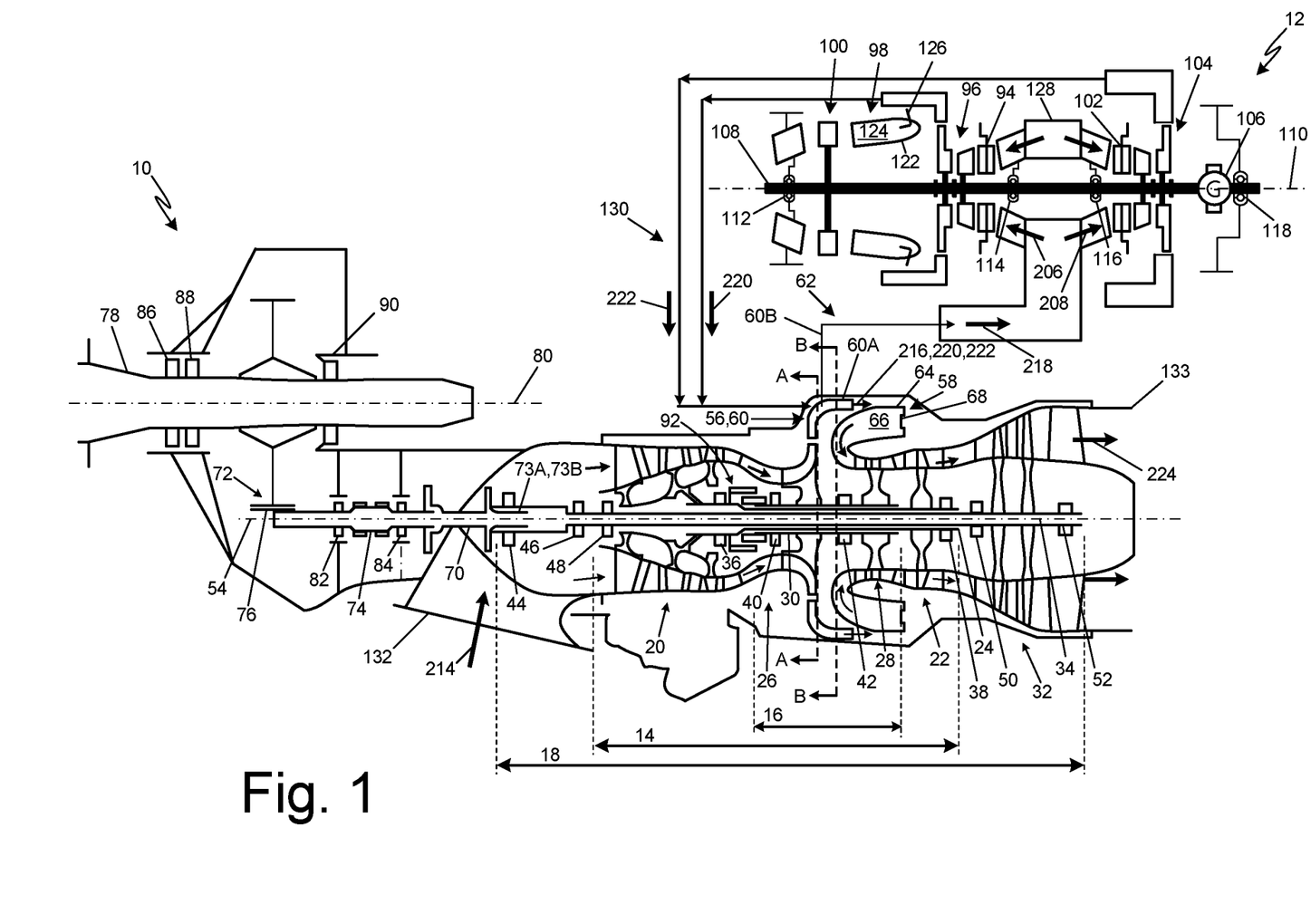
FIG. 1 is a schematic representation of a gas turbine engine that includes a boost spool.

FIG. 1 is a schematic representation of gas turbine engine 10 that includes boost spool 12 in accordance with an exemplary embodiment of this disclosure. Gas turbine engine 10 is a turboprop engine that includes low pressure spool 14, high pressure spool 16, and power spool 18. Low pressure spool 14 includes low pressure compressor 20 mechanically and rotationally connected to low pressure turbine 22 by shaft 24, and high pressure spool 16 includes high pressure compressor 26 mechanically and rotationally connected to high pressure turbine 28 by shaft 30. Power spool 18 includes power turbine 32 mechanically and rotationally connected to shaft 34. Bearings 36 and 38 support shaft 24 of low pressure spool 14, and bearings 40 and 42 support shaft 30 of high pressure spool 16, each at one of a forward end, an aft end, or an intermediate location of respective shafts. Power shaft 34 is supported by bearings 44, 46, 48, 50, and 52 at the forward and aft ends as well as intermediate locations along shaft 34. Low pressure spool 14, high pressure spool 16, and power spool 18 are coaxial, each extending along and rotating about centerline 54 independently of one another (i.e., without a mechanical connection that couples two or more of low pressure spool 14, high pressure spool 16, and power spool 18 in a rotational direction).

Compressors and turbines 20, 22, 26, 28, and 32 each include at least one compressor stage or turbine stage, each stage formed by a row of stationary vanes and a row of rotating blades. Blade rotors of compressors stages can be axial compressors, radial compressors, or mixed flow compressors. In the exemplary embodiment depicted by FIG. 1, low pressure compressor 20 has three axial stages and low pressure turbine 22 has one axial stage. High pressure compressor 26 has a single radial compressor rotor, and high pressure turbine 28 has one axial stage. Power turbine 32 has two axial stages. However, in other embodiments, the number of stages in each compressor or turbine, as well as the radial, axial, or mixed configuration can be selected based on the desired pressure ratios as is known in the art.

At times, boost spool 12, low pressure spool 14, high pressure spool 16, and power spool 18 may be referred to as a first spool, a second spool, a third spool, and/or a fourth spool in which "first", "second", "third", and "fourth" correspond to one of boost spool 12, low pressure spool 14, high pressure spool 16, and power spool 18. Similarly, "first", "second", "third", and/or "fourth" labels may be used in conjunction with corresponding components of the first spool, the second spool, the third spool, and/or the fourth spool in order to distinguish components of each spool from components of the other spools.

Between high pressure compressor 26 and high pressure turbine 28, gas turbine engine 10 includes diffuser 56 and combustor 58 (i.e., primary combustor). Diffuser 56 is a radial diffuser positioned radially outward from high pressure compressor 26, a radial compressor rotor. Diffuser 56 includes multiple ducts 60 (see FIG. 2). Collectively, inlets of diffuser ducts 60 define an inlet to diffuser 56 in which individual duct inlets are distributed circumferentially about an outer periphery of high pressure compressor 26. A first set of ducts 60A extend from high pressure compressor 26 to communicate with a location adjacent and upstream from combustor 58 while a second set of ducts 60B extends from high pressure compressor 26 to form part of inlet duct assembly 62 of boost spool 12, which fluidly connects diffuser 56 to boost spool 12. Combustor 58 includes casing 64 that forms an annular combustion chamber 66. Within casing 64, combustor 58 includes injectors 68 for introducing fuel. Combustor 58 discharges to high pressure turbine 28.

Gas turbine engine 10 includes torque shaft 70 and reduction gearbox 72 for driving a propeller (not shown). An end of power shaft 34 includes internal spline 73A that mates with external spline 73B of torque shaft 70, rotationally coupling shaft 34 to torque shaft 70. Reduction gearbox 72 includes input shaft 74, gearing 76, and propeller shaft 78. Torque shaft 70 mates with input shaft 74 via a flanged or splined connection to transfer rotation of power spool 18 to gearing 76, which drives propeller shaft 78 in rotation about propeller axis 80. Gearing 76 can be a series of spline gears, an epicyclic arrangement, or other gear train. The gear ratio of gearing 76 is less than one such that propeller shaft 78 rotates at a slower speed than shaft 34 of power spool 18. Bearings 82 and 84 support input shaft 74, and bearings 86, 88, and 90 support propeller shaft 78, each bearing supporting input shaft 74 of propeller shaft 78 with respect to a casing of gas turbine engine 10.

In some embodiments, gas turbine engine 10 can include electric machine 92. Electric machine 92 can be a motor, a generator, or a motor-generator mounted to low pressure shaft 24, high pressure shaft 30, power shaft 34, or propeller shaft 78. As shown, FIG. 1 depicts electric machine 92 mounted between bearings 36 and 40. A rotor of electric machine 92 can be mounted to shaft 30 of high pressure spool 16 while a stator of electric machine 92 can be mounted to shaft 24 of low pressure spool 14.

Boost spool 12 includes variable inlet guide vane stage 94, boost compressor 96, secondary combustor 98, and boost turbine 100. Additionally, boost spool 12 includes variable inlet guide vane stage 102, load compressor 104, and electric machine 106. Boost compressor 96, boost turbine 100, and load compressor 104 include at least one compressor stage or turbine stage, each stage formed by a row of stationary vanes and a row of rotating blades. Boost compressor 96, boost turbine 100, load compressor 104, and electric machine 106 mount to boost shaft 108, each component rotatable about boost centerline 110. Bearings 112, 114, 116, and 118 support boost shaft 108 with respect to a casing surrounding boost spool 12. The casing can be a boost casing discrete from a casing surrounding low pressure spool 14 and high pressure spool 16 or boost spool 12 can be supported from a casing integrated with a casing or casings surrounding low pressure spool 14 and/or high pressure spool 16.

Electric machine 106 can be a motor, a generator, or a motor-generator. Electric machine 106 can be mounted at any location along shaft 108. As shown in FIG. 1, electric machine 106 is adjacent to load compressor 104.

Secondary combustor 98 is disposed between and communicates with boost compressor 96 and boost turbine 100. Like primary combustor 58, secondary combustor 98 includes casing 122 that forms annular combustion chamber 124. Within annular combustion chamber 124, secondary combustor 98 includes injectors 126 for introducing fuel.

Each of variable inlet vane stage 94 and variable inlet vane stage 102 forms an array of circumferentially spaced vanes in communication with boost inlet plenum 128 upstream of boost compressor 96 and load compressor 104. Vanes of variable inlet guide vane stage 94 and vanes of variable inlet guide vane stage 102 are rotatable about respective spanwise vane axes. An angular position of variable inlet guide vane stage 94 and variable inlet guide vane stage 102 ranges between a closed position, a neutral or nominal position, and an open position to vary an open area into boost compressor 96 and load compressor 104, respectively.

Boost spool 12 receives compressed air from diffuser 56 through inlet duct assembly 62, which fluidly connects diffuser 56 to inlet duct plenum 128. Outlet duct assembly 130 fluidly connects boost turbine 100 and load compressor 104 to diffuser 56 and/or combustor 58. Each of inlet duct assembly 62 and outlet duct assembly 130 includes one or more ducts, pipes, conduits, and/or manifolds to deliver a portion of gas turbine engine 10 flow to or from boost spool 12.

The position and orientation of boost spool 12 relative to centerline 54 is selected based on the mechanical and/or electro-mechanical coupling. Boost centerline 110 can be parallel and offset from centerline 54 of gas turbine engine 10 as schematically shown by FIG. 1. Furthermore, FIG. 1 shows boost spool 12 with a reverse flow orientation (i.e., aft-to-forward flow) such that a flow direction through boost spool 12 from compressor 96 to turbine 100 is opposite a flow direction (i.e., forward-to-aft flow) through gas turbine engine 10 from inlet 132 to an outlet of gas turbine engine 10 downstream from power turbine exit 133. Alternatively, boost centerline 110 can be oblique, perpendicular, or eccentric to centerline 54. In some embodiments, boost spool 12 is located remotely from low pressure spool 14, high pressure spool 16, and power spool 18 while in other embodiments, boost spool 12 can be located directly adjacent to or attached to casings surrounding spools 14, 16, and 18. In either of these arrangements, boost spool 12 can be an auxiliary power unit (APU).

For all mounting positions of boost spool 12, the location and orientation of boost spool 12 permits boost spool 12 to receive a compressed air flow from gas turbine engine 10 and to discharge an expanded air flow to gas turbine engine 10. Boost spool 12 can receive a compressed airflow from any compressor stage of gas turbine engine 10 to achieve varying degrees of boost compression. In one exemplary embodiment, boost spool 12 receives a compressed air flow from a location that is downstream from the last compressor stage of the gas turbine engine. In the case of gas turbine engine 10, boost spool 12 receives airflow from diffuser 56 and discharges an expanded airflow to diffuser 56. In other instance, boost spool 12 receives airflow from diffuser 56 and discharges an expanded airflow to both diffuser 56 and combustor 58, which is downstream of high pressure compressor 26 and upstream from high pressure turbine 28.

Figure 2:
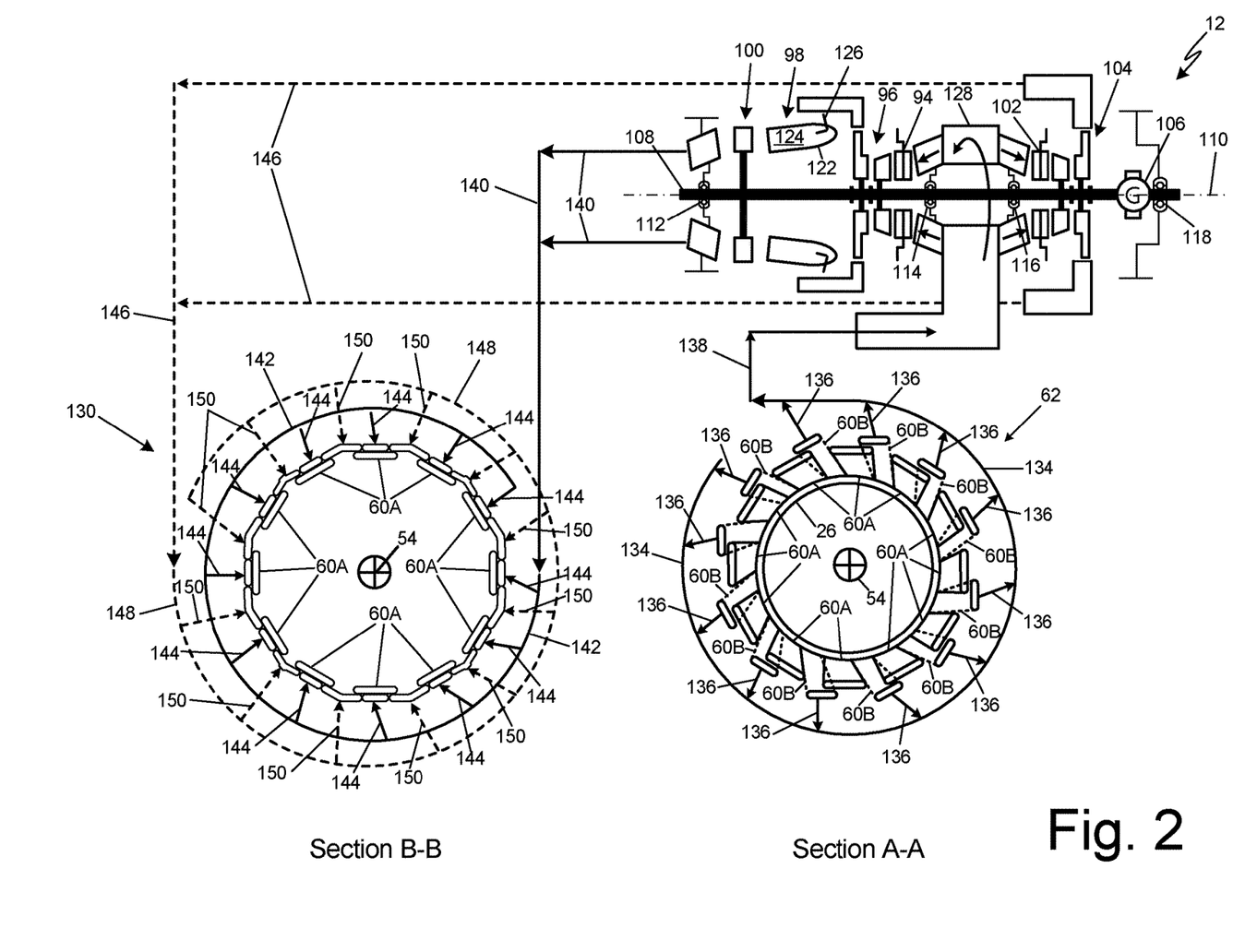
FIG. 2 is a first schematic representation of an inlet duct assembly and outlet duct assembly of the gas turbine engine.

FIG. 2 is a schematic depicting an exemplary implementation of inlet duct assembly 62 and outlet duct assembly 130. Section A-A depicts inlet duct assembly 62 taken along line A-A in FIG. 1. Section B-B depicts outlet duct assembly 130 taken along line B-B in FIG. 1. As shown in Section A-A, first ducts 60A and second ducts 60B of diffuser 56 are circumferentially distributed about high pressure compressor 26. Inlets 132A of first diffuser ducts 60A and inlets 132B of second diffuser ducts 60B are circumferentially arranged about a radially outer periphery of high pressure compressor 26. Each of inlets 132A are interposed with inlets 132B such that each inlet 132A is disposed between two circumferentially adjacent inlets 132B and each inlet 132B is disposed between two circumferentially adjacent inlets 132A. Each of first diffuser ducts 60A (i.e., primary combustor ducts) extend from high pressure compressor 26 towards primary combustor 58. Each of second diffuser ducts 60B (i.e., boost ducts) extend from high pressure compressor 26 to connect with inlet duct assembly 62.

Inlet duct assembly 62 can include collection manifold 134, which may communicate directly with second diffuser ducts 60B. In other embodiments, inlet duct assembly 62 can include inlet branch ducts 136 that fluidly connect and extend second diffuser ducts 60B to manifold 134. Collection manifold 134 can be a plenum with a cross-sectional area that is fixed along its circumferential length or increases with each or as a function of second diffuser duct 60B or inlet branch ducts 136. In other embodiments, collection manifold 134 can be a pipe or duct that has a progressively increasing cross-sectional area along its circumferential length as each second diffuser duct 60B or inlet branch duct 136 connects to collection manifold 134. For instance, collection manifold 134 can be a series of pipe segments in which each branch duct 136 or second diffuser duct 60B joins one of the pipe segments with a y-section or a t-section. Extending from collection manifold 134, some embodiments of inlet duct assembly 62 include main inlet duct 138 that fluidly connects collection manifold 134 to inlet duct plenum 128 of boost spool 12. Disposed between variable inlet guide vane stage 94 associated with boost compressor 96 and variable inlet guide vane stage 102 associated with load compressor 104, inlet duct plenum 128 extends circumferentially about boost shaft 108 to distribute air extracted from diffuser 56 evenly along annular inlets to variable inlet guide vane stage 94 and variable inlet guide vane stage 102.

Outlet duct assembly 130 extends from an outlet of boost spool 12 downstream from boost turbine 100 to join first diffuser ducts 60A upstream of primary combustor 58. As shown in FIG. 2, outlet duct assembly 130 can include turbine outlet duct 140 extending from the outlet of boost turbine 100 to outlet manifold 142, which extends circumferentially about diffuser 56. Outlet manifold 142 communicates with boost discharge ducts 144. Boost discharge ducts 144 are distributed circumferentially about centerline 54 radially outward from first diffuser ducts 60A.

Additionally, outlet duct assembly 130 can include load compressor duct 146 extending from an outlet of load compressor 104 to outlet manifold 148, which extends circumferentially about diffuser 56. Outlet manifold 148 communicates with load compressor discharge ducts 150. Discharge ducts 150 are distributed circumferentially about centerline 54 and are interposed between boost discharge ducts 144 radially outward of first diffuser ducts 60A.

Figure 3:
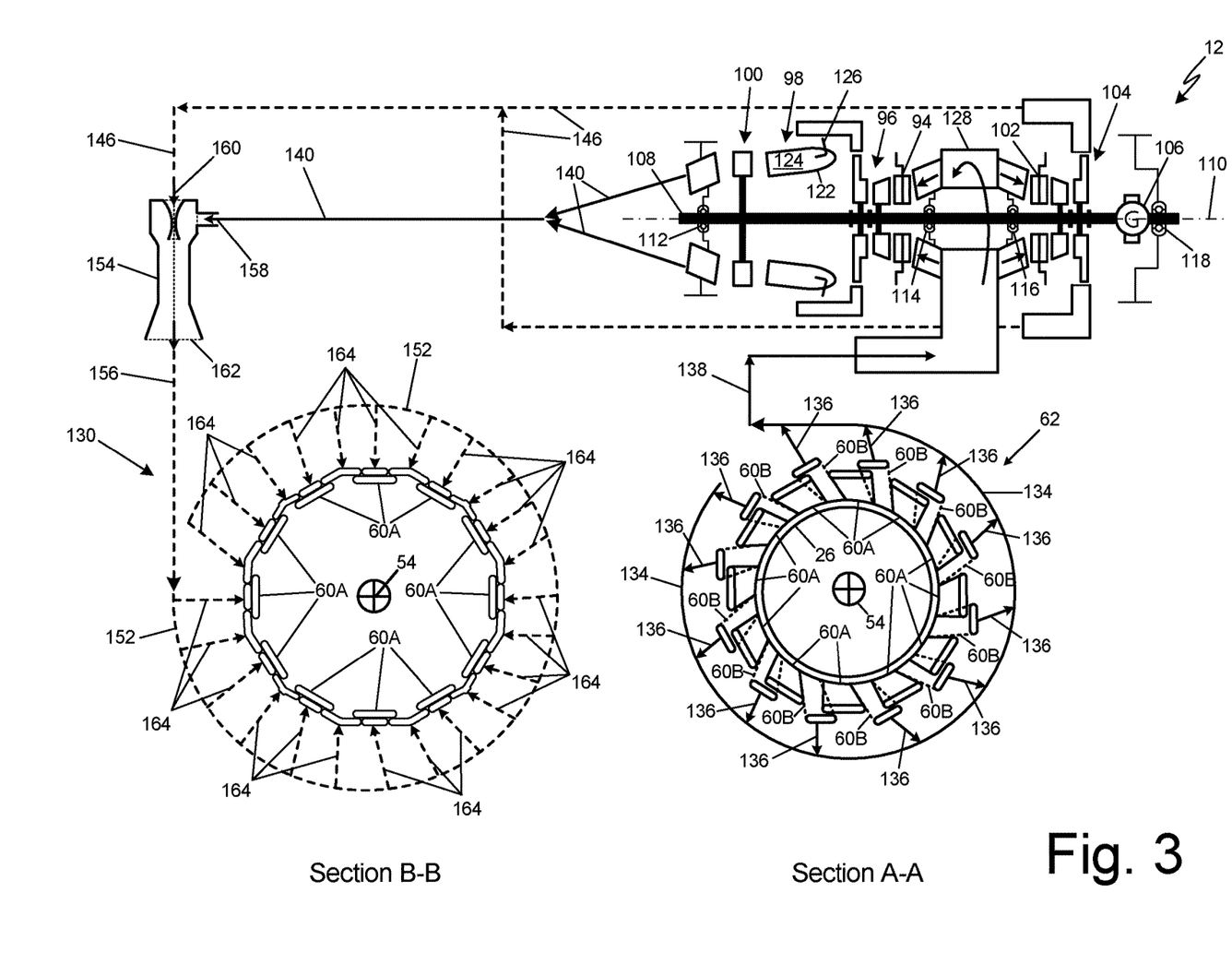
FIG. 3 is a second schematic representation of an inlet duct assembly and outlet duct assembly of the gas turbine engine.

Alternatively, outlet duct assembly 130 can combine flow from discharged from load compressor 104 and boost turbine 100 prior to introduction into primary combustor 58 as shown in FIG. 3. Accordingly, in place of outlet manifolds 142 and 148, outlet duct assembly 130 includes combined discharge manifold 152. Additionally, outlet duct assembly 130 includes ejector 154 and mixed flow duct 156. Turbine outlet duct 140 extends from an outlet of boost turbine 100 to inlet 158 of ejector 154, and load compressor duct 146 extends from an outlet of load compressor 104 to working fluid inlet 160 of ejector 154. Working fluid inlet 160 is centrally disposed within ejector 154. Accordingly, given proper pressure conditions at inlet 158 and working fluid inlet 160, air entering ejector 154 from load compressor 104 entrains air through inlet 158. Mixed flow duct 156 extends from outlet 162 of ejector 154 to combined discharge manifold 152. Combined boost discharge ducts 164 extend from discharge manifold 152 towards primary combustor 58 along with first diffuser ducts 60A. Combined boost discharge ducts 164 are circumferentially distributed about centerline 54 and diffuser 56 radially outward from first diffuser ducts 60A.

Figure 4:
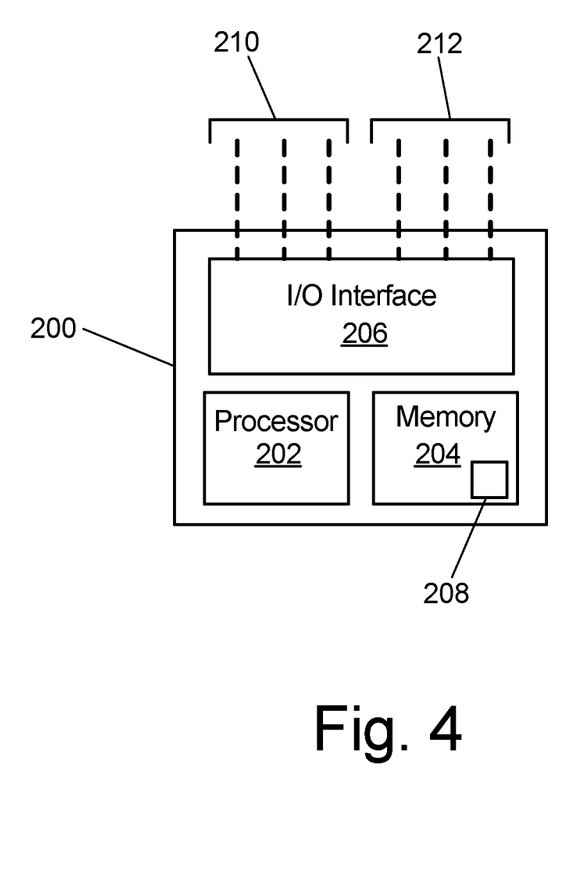
FIG. 4 is a schematic representation of a controller operable to regulate operation of the gas turbine engine.

FIG. 4 is a schematic of controller 200 that regulates the operation of gas turbine engine 10 and, more particularly, a flow division between boost compressor 96 and load compressor 104 of boost spool 12. Additionally, controller 200 regulates fuel flow rates to primary combustor 58 and secondary combustor 98 based on one or more engine parameters, aircraft parameters, and/or exterior conditions. Controller 200 can include a standalone control unit or a control module incorporated into another control unit. Furthermore, controller 200 can be an amalgamation of distinct control units and/or distinct control modules that together perform the functions described in this disclosure. In some embodiments, controller 200 can be a full authority digital engine control (FADEC), an electric engine controller (EEC), or an engine control unit (ECU).

Controller 200 includes processor 202, memory 204, and input/output interface 206. Processor 202 executes one or more control algorithms 208 stored within memory 204 to output engine control signals 210 based on one or more input signals 212. Examples of processor 202 can include any one or more of a microprocessor, a controller, a digital signal processor (DSP), an application specific integrated circuit (ASIC), a field-programmable gate array (FPGA), or other equivalent discrete or integrated logic circuitry.

Memory 204 can be configured to store information within controller 200. Memory 204, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Memory 204 can include volatile and non-volatile computer-readable memories. Examples of volatile memories can include random access memories (RAM), dynamic random-access memories (DRAM), static random-access memories (SRAM), and other forms of volatile memories. Examples of non-volatile memories can include, e.g., magnetic hard discs, optical discs, flash memories, or forms of electrically programmable memories (EPROM) or electrically erasable and programmable (EEPROM) memories.

Input/output interface or I/O interface 206 can be a series of input and output channels that electrically communicate with an engine control bus. The engine control bus interconnects controller 200 with various components of the gas turbine engine 10 described above such that engine control signals 210 can be transmitted to individual engine components and input signals 212 can be received.

Engine control signals 210, input signals 212, or both engine control signals 210 and input signals 212 can be an analog signal or a digital signal. For example, an analog signal can be a voltage that varies between a low voltage to a high voltage whereas digital signals can be a series of discrete voltage states distributed over a voltage range. Operatively, engine control signals 210 cause various components of gas turbine engine 10 to change state or position. For example, engine control signals 210 can be used to vary the position of one or more fuel valves to vary the fuel rate entering a combustor. Other examples of engine control signals 210 include signals associated with an angular position of variable vane stages. Input signals 212 are representative of one of engine parameters, aircraft parameters, and environmental parameters. Exemplary engine parameters include rotational speed of a low pressure spool, high pressure spool, boost spool, and/or fan shaft, the state or position of fuel valves, bleed valves, the state or position of clutch assemblies, propeller blade pitch angle, the temperature or pressure within the compressor, combustor, or turbine, and engine power. Aircraft parameters include various parameters associated with an aircraft such as power lever angle, altitude, pitch angle, yaw angle, roll angle, rate of climb, and airspeed, among other possible parameters. Exterior parameters include ambient temperature and pressure at the inlet of gas turbine engine 10.

In operation, gas turbine engine 10 receives ambient air flow 214 thorough inlet 132, which communicates with low pressure compressor 20. Rotation of low pressure compressor 20 and high pressure compressor 26 compresses air flow 214. High pressure compressor 26 discharges compressed air flow 214 into diffuser 56. Within diffuser 56, compressed air flow 214 divides into primary flow 216 and secondary flow 218. First diffuser ducts 60A deliver primary flow 216 from high pressure compressor 26 to combustor 58 while the second set of diffuser ducts 60B delivers secondary flow 218 to inlet plenum 128 of boost spool 12 via inlet duct assembly 62. Each of diffuser ducts 60A includes divergent walls that reduce primary flow 216 velocity and thereby increase static pressure of flow 216 before entering combustor 58. Fuel injected into combustor 58 mixes with primary flow 216, and one or more ignitors combust the fuel-to-air mixture to produce a compressed and heated primary flow 216 that is discharged into high pressure turbine 28.

Based on the angular position of variable inlet guide vane stage 94 and the angular position of variable inlet guide vane stage 102, secondary flow 218 is further divided into boost flow 220 and load compressor flow 222. Boost flow 220 passes through variable inlet guide vane stage 94 and into boost compressor 96. As boost compressor 96 rotates, boost flow 220 is compressed and flows into secondary combustor 98. Within secondary combustor 98, injectors 126 introduce fuel and the fuel-to-air mixture is ignited, further heating and increasing pressure of boost flow 220. Boost flow 220 discharges from secondary combustor 98 into boost turbine 100 and imparts work to boost turbine 100 to thereby rotate shaft 108, boost compressor 96, load compressor 104, and electric machine 106. Boost flow 220 discharges from boost turbine 100 into outlet duct assembly 130. Load compressor flow 222 passes through variable inlet guide vane stage 102 and into load compressor 104. Work imparted to load compressor flow 222 by load compressor 104 compresses load compressor flow 222. Load compressor flow 222 discharges from load compressor 104 into outlet duct assembly 130. Outlet duct assembly 130 returns boost flow 220 and load compressor flow 222 to a location upstream from primary combustor 58 proximate outlets of first diffuser ducts 60A. Boost flow 220 and load compressor flow 222 can remain separate until mixing with primary flow 216 discharged from first diffuser ducts 60A. Alternatively, boost flow 220 and load compressor flow 222 can mix prior to combining with primary flow 216 of first diffuser ducts 60A.

After mixing, primary flow 216, boost flow 220, and load compressor flow 222 enter primary combustor 58. Within primary combustor 58, injectors 68 introduce fuel to produce a fuel-to-air mixture and the fuel-to-air mixture ignites. Combined flow 224 discharges from combustor 58 and enters, in sequential order, high pressure turbine 28, low pressure turbine 22, and power turbine 32. Combined flow 224 interacts with vanes and blades of high pressure turbine 28 causing rotation of shaft 30 about centerline 54 and driving rotation of high pressure compressor 26. Similarly, combined flow 224 interacting with vanes and blades of low pressure turbine 22 cause rotation of shaft 24 about centerline 54 to drive rotation of low pressure compressor 20. Additionally, combined flow 224 interacting with vanes and blades of power turbine 32 cause rotation of shaft 34 about centerline 54 to drive rotation of propeller shaft 78 via torque shaft 70, input shaft 74, and gearing 76. Downstream of power turbine 32, combined flow 224 discharges from engine 10 as exhaust at a location downstream from outlet 133.

The flow division between boost flow 220 and load compressor flow 222 can be managed by controller 200 to achieve increased efficiency of gas turbine engine 10 during operation of boost spool 12. For example, controller 200 can vary the angular position of variable inlet guide vane stage 94 based on the engine pressure ratio of boost spool. The engine pressure ratio of boost spool (EPRB) is determined as the pressure of secondary flow 218 within inlet duct assembly 62 adjacent to diffuser 56 (i.e., pressure P3-2) divided by pressure of boost flow 220 discharged from boost turbine and within outlet duct assembly 130. The pressure of boost flow 220 is measured at a location upstream from the discharge end of outlet duct assembly 130 (i.e., pressure P5-2), whether outlet duct assembly 130 includes ejector 154 or not. The target engine pressure ratio of boost spool 12 is selected based on a desired overall pressure ratio of gas turbine engine 10 for a given operating condition or power level (i.e., cruise power). For instance, the target engine pressure ratio of boost spool can be from 0.67 to 0.85.

At the same time, controller 200 can vary the angular position of variable inlet guide vane stage 102 based on a pressure of load compressor flow 222 at a discharge end of outlet duct assembly 130 (i.e., pressure P5-3) relative to a pressure of boost flow 220 at a discharge end of outlet duct assembly 130 (i.e., pressure P5-2). For instance, a target discharge pressure for load compressor flow 222 can be at least 10% greater than the discharge pressure of boost flow 220. At an upper end, the discharge pressure of load compressor flow can be determined based on pressure loss incurred within inlet duct assembly 62 and outlet duct assembly 130 as well as any associated pressure loss associated with separating or mixing boost flow 220, load compressor flow 222, primary flow 216, and/or secondary flow 218. Accordingly, load compressor flow 222 can be used as a working fluid, entraining boost flow 220 into combustor 58 as facilitated by ejector 154 shown in FIG. 3 or duct arrangements shown in section A-A and section B-B of FIG. 2.

Figure 5:
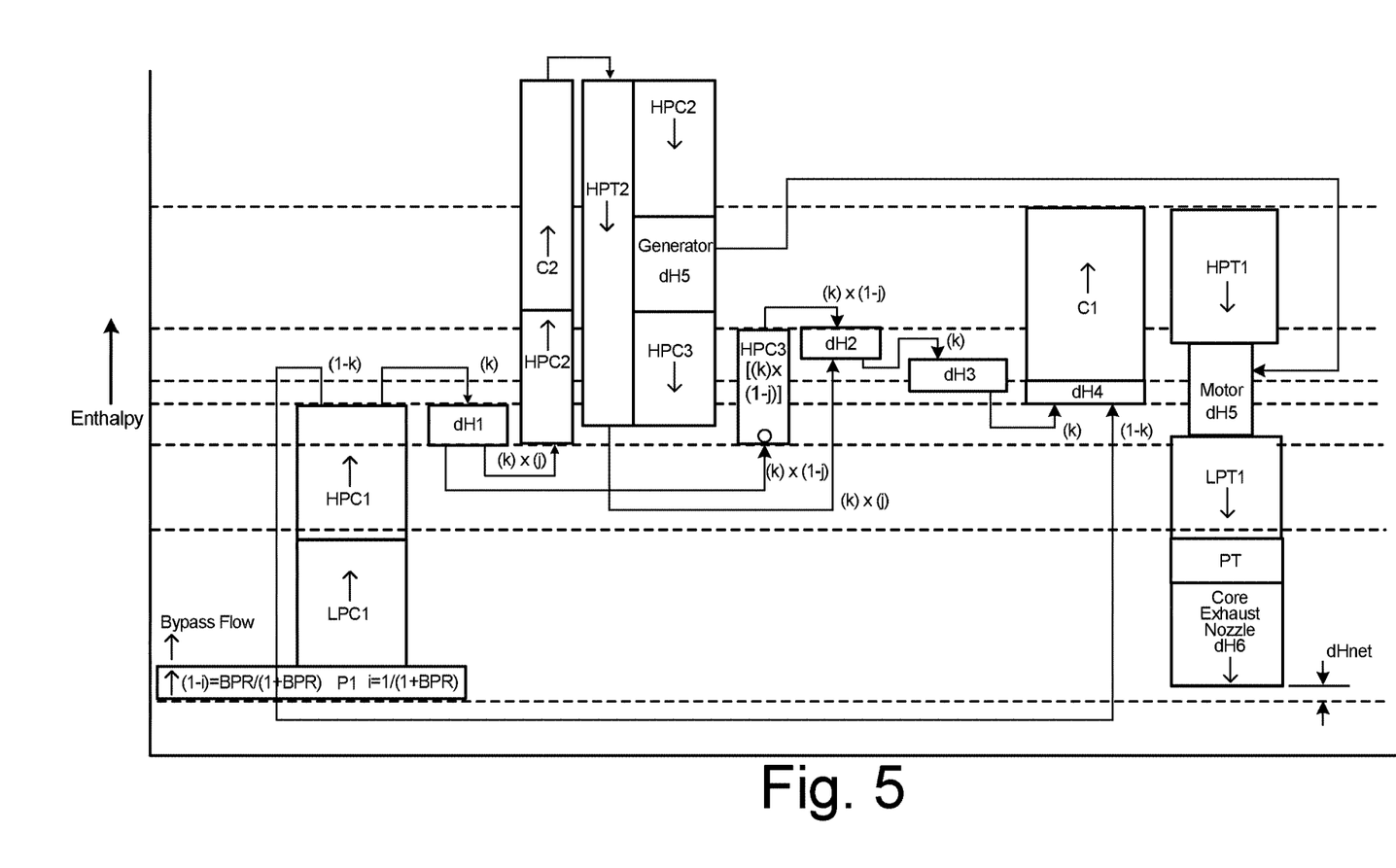
FIG. 5 is an exemplary enthalpy graph showing relative enthalpy gains and losses associated with operation of the gas turbine engine and the boost spool.

FIG. 5 is an exemplary enthalpy graph showing relative enthalpy gains and losses associated with operation of gas turbine engine 10 and boost spool 12. P1 represents the enthalpy increase provided by propeller (not shown) as driven by propeller shaft 78. Flow faction i represents the portion of flow propellered through the propeller that enters gas turbine engine 10 through inlet 132. The reminder of propeller flow (i.e., a flow fraction equal to 1-i) propels gas turbine engine 10 and the aircraft in flight. The flow division between core flow or ambient flow i and bypass flow 1-i can be expressed as bypass flow ratio BPR, which is the mass flow rate of bypass flow 1-i divided by the mass flow rate of core flow i. Expressed in terms of bypass flow ratio BFR, core flow i is equal to one divided by the sum of one plus the bypass flow ratio, i.e., 1/(1+BFR). Bypass flow is equal to the bypass flow ratio divided by the sum of one plus the bypass flow ratio, i.e., BFR/(1+BFR).

LPC1 and HPC1 represent an increase of enthalpy between inlet 132 and an outlet of high pressure compressor 26. At an outlet of high pressure compressor 26, compressed air flow 214 divides into secondary flow 218 represented by flow fraction (k) and primary flow 216 represented by flow fraction [1-k]. Second diffuser ducts 60B direct secondary flow 218 (i.e., flow fraction k) through inlet duct assembly 62 to inlet duct plenum 128. A first enthalpy loss (dH1) represents an enthalpy decrease associated with egress from diffuser 56 and flow through inlet duct assembly 62 associated with secondary flow 218 (i.e., flow fraction k). First diffuser ducts 60A direct primary flow 216 (i.e., flow fraction 1-k) to a location upstream from primary combustor 58.

The relative positions of variable inlet guide vane stage 94 and variable inlet guide duct vane stage 102 adjacent to inlet duct plenum 128, partitions secondary flow 218 (i.e., flow fraction k) as further divided into boost flow 220 represented by flow fraction (k×j) and load compressor flow 222 represented by flow fraction (k×(1-j)). Variable inlet guide vane stage 94 directs boost flow 220 into boost compressor 96. Boost compressor 96 compresses boost flow 220 as indicated by enthalpy increase HPC2. Compressed boost flow 220 enters secondary combustor 98 where it is mixed with fuel and the fuel-air mixture ignited as indicated by enthalpy increase C2. Heated and compressed boost flow 220 discharges from secondary combustor 98 into boost turbine 100. Boost flow 220 expands across boost turbine 100 as indicated by the enthalpy decrease HPT2. Work extracted by boost turbine 100 drives boost compressor 96 and load compressor 104. Additionally, where electric machine 106 operates as a generator, boost turbine 100 drives electric machine 106. Variable inlet vane stage 102 directs load compressor flow 222 into load compressor 104. Load compressor 104 compresses load compressor flow 222 as indicated by enthalpy increase HPC3. In some embodiments, boost flow 220 and load compressor flow 222 mix prior to reinduction at a location upstream from primary combustor 58. Enthalpy decrease dH2 represents the enthalpy change produced by mixing boost flow 220 and load compressor flow 222. Enthalpy decrease dH3 represents the enthalpy change associated with the ingress of secondary flow 218 (i.e., mixed boost flow 220 and load compressor flow 222) at a location upstream from primary combustor 58 and proximate a discharge location of first diffuser ducts 60A.

Load compressor 104 can be operated such that enthalpy increase HPC3 equates to the enthalpy losses dH1, dH2, and dH3. Effectively, secondary flow 218 discharged from boost spool 12 can rejoin primary flow 216 with an enthalpy equal to or greater than the enthalpy of secondary flow 218 discharged from high pressure compressor 26 as shown in FIG. 5.

Primary flow 216 and secondary flow 218 mix upstream from primary combustor 58. Because the pressure P5-2 of boost spool 12 is greater than the pressure of diffuser 56 (i.e., pressure P3-1), mixing primary flow 216 and secondary flow 218 increases enthalpy of the mixed flow as indicated by dH4. Within primary combustor 58, injected fuel mixes with the flow and ignites producing the associated enthalpy increase C1.

Combined flow 224 discharges from primary combustor 58 into high pressure turbine 28 and expands across high pressure turbine 28. HPT1 represents the enthalpy decrease associated with high pressure turbine 28. Work extracted from high pressure turbine 28 drives high pressure compressor 26. Downstream from high pressure turbine 28, combined flow 224 expands across low pressure turbine 22 as represented by enthalpy decrease LPT1. Work extracted from low pressure turbine 22 drives low pressure compressor 20.

In some embodiments, low pressure turbine 22, high pressure turbine 28, or both low pressure turbine 22 and high pressure turbine 28 drive one or more engine accessories and/or electric machine 92. Accordingly, the magnitude of LPT1 and/or HPT1 increases in proportion to the work required to drive these additional components. In other embodiments, electrical output from electric machine 106 of boost spool 12 can be used to drive electric machine 92 as a motor as indicated by dH5 in FIG. 5.

Combined flow 224 discharged from low pressure turbine 22 further expands across power turbine 32. The associated enthalpy decrease PT represents work extracted from combined flow 224 that drives a propulsor of an aircraft and the associated drive train components. Where the gas turbine engine is a turboprop engine, such as gas turbine engine 10 shown in FIG. 1, power turbine 32 drives torque shaft 70, input shaft 74, gearing 76, propeller shaft 78, and propeller (not shown). However, in other embodiments, the gas turbine engine can be a turboshaft engine or a bypass engine. In these instances, the gas turbine engine does not include power turbine 32 and, instead, the magnitude of LPT1 associated with low pressure turbine 22 increases to drive the propulsor (e.g., a fan or main rotor) and associated drive train components (e.g., losses associated with shafts, gearboxes, and bearings). Downstream from power turbine 32, combined flow 224 discharges from gas turbine engine 10 through exhaust nozzle as represented by enthalpy decrease dH6. As shown in FIG. 5, gas turbine engine 10 produces imparts a net enthalpy change, dHnet, to the ambient air to propel the aircraft in flight.

Operating gas turbine engine 10 with boost spool 12 in which boost spool 12 includes load compressor 104 reduces an average temperature of secondary flow 218 reintroduced with primary flow 216 at a location upstream from primary combustor 58. Lower temperatures of secondary flow 218 relative to operation of boost spool 12 in which the entirety of secondary flow 218 flows through secondary combustor 98 increases operational life of primary combustor 58 components. Where mixing of boost flow 220 and load compressor flow 222 occurs upstream of primary combustor 58 with primary flow 216, circumferentially distributing boost flow 220 discharged from ducts 144 about centerline 54 and between adjacent ducts 150 that discharge load compressor flow 222 contributes to temperature uniformity of the combined flow entering primary combustor 58. Similar benefits are provided by embodiments utilizing ejector 154 to mix boost flow 220 and load compressor flow 222 within outlet duct assembly 130 upstream from primary combustor 58. Additionally, ejector 154 drives mixing of secondary flow 218 with primary flow 216.

Operating boost spool 12 with load compressor 104 enables primary combustor 58 to operate at uncharacteristically low fuel-air-ratios (FAR) relative to conventional gas turbine engines (e.g., without boost spool 12 and load compressor 104) at intermediate power levels (e.g., cruise power). Furthermore, operating boost spool 12 with load compressor 104 enables primary combustor 58 to operate at uncharacteristically high fuel-air-ratios (FAR) relative to convention gas turbine engines at high power levels (e.g., takeoff and climb power).

Exemplary fuel-air-ratios for gas turbine engine 10 operating with boost spool 12 are presented in Table 1, Table 2, and Table 3 below. Operation of gas turbine engine 10 with boost spool 12 and load compressor 104 can be characterized by engine operating condition (i.e., power level), a flow split between primary flow 216 and secondary flow 218 (i.e., k, 1-k), and a flow split of secondary flow 218 between boost flow 220 and load compressor flow 222 (i.e., j, 1-j). For instance, gas turbine engine 10 can include, in order of increasing power level, flight idle, cruise, climb, and takeoff operating conditions, among other possible intermediate power levels. The flow split between primary flow 216 and secondary flow 218 is indicated by flow fraction k (i.e., the fraction of secondary flow taken from ambient or core flow 214). The flow split between boost flow 220 and load compressor flow 222 is indicated by flow fraction j (i.e., the fraction of boost flow k taken from secondary flow 218).

The fuel-air-ratio, "FAR Boost Spool", corresponds to an exit or outlet of secondary combustor 98 and varies between a value necessary for minimum safe operation (e.g., FAR approximately equal to 0.01) and a maximum fuel-air-ratio permitted by materials and/or cooling of casing 122 of secondary combustor 98 (e.g., FAR equal to or greater than 0.05). The fuel-air-ratio, "FAR Ingress", coincides with a location upstream from primary combustor 58 where boost flow 220 and load compressor flow 222 rejoin primary flow 216. For example, "FAR Ingress" may correspond to a location between outlets of boost outlet ducts 144 or load compressor outlet ducts 146 and primary combustor 58 (see FIG. 2) or between outlets of discharge ducts 164 and primary combustor 58 (see FIG. 3). The fuel-air-ratio, "FAR Primary Combustor Exit", is determined at the exit of primary combustor 58 and is based on total fuel flow added by primary combustor 58 and secondary combustor 98 divided by total flow through gas turbine engine 10 (e.g., ambient flow 214 or combined flow 224). The fuel-air-ratio, "FAR Primary Combustor Exit Excluding Secondary Combustor Fuel Flow", is determined at the exit of primary combustor 58 and is based on fuel flow added by primary combustor 58 only divided by total flow through gas turbine engine 10 (e.g., ambient flow 214 or combined flow 224).

As shown by Table 1, Table 2, and Table 3, the fuel-air-ratios at the exit of primary combustor 58 (including fuel flow added by secondary combustor 98) is greater than 0.010 for all operational conditions of gas turbine engine 10. At high power operation associated with climb and takeoff power (Table 3), the fuel-air-ratio at the exit of primary combustor 58 is greater than 0.05 and is equal to approximately 0.061 in the depicted case. In a gas turbine engine without boost spool 12 and load compressor 104, such fuel-air-ratios at high power levels (e.g., takeoff and climb power) cause excessive temperatures within high pressure turbine 28. Accordingly, gas turbine engine 10 operating with boost spool 12 and load compressor 104 can achieve higher fuel-air-ratios at high power levels (e.g., takeoff and climb power) relative to conventional gas turbine engines. Furthermore, gas turbine engine 10 operating with boost spool 12 and load compressor 104 can achieve lower fuel-air-ratios relative to conventional gas turbine engines at cruise power levels. As shown by Table 2, the fuel-air-ratio (FAR) at the exit of primary combustor 58 can be less than 0.010 at cruise power (see "FAR Primary Combustor Exit"). The fuel-air-ratio (FAR) at the exit of primary combustor 58 excluding secondary combustor fuel flow is between 0.016 and 0.020 at low engine thrust (Table 1) and high engine thrust (Table 3). However, the fuel-air-ratio at the exit of primary combustor 58 excluding secondary combustor fuel flow is reduced at cruise power, ranging from 0.001 to 0.005 (Table 2) and contributing to improved efficiency of gas turbine engine.

TABLE 1

Exemplary Fuel-Air-Ratio for Low Engine Thrust (e.g. Flight Idle) and Various Flow Divisions

| Operating Mode And Flow Division To Boost Spool 12 | Load Compressor Flow = High | | Load Compressor Flow = Low | |
|---|---|---|---|---|
| k = 0.1 | j = 0.1 | | j = 0.9 | |
| FAR Boost Spool | 0.010 | 0.050 | 0.010 | 0.050 |
| FAR Ingress | 0.001 | 0.005 | 0.009 | 0.045 |
| FAR Primary Combustor Exit | 0.021 | 0.021 | 0.021 | 0.021 |
| FAR Primary Combustor Exit Excluding Secondary Combustor Fuel Flow | 0.020 | 0.016 | 0.020 | 0.016 |

TABLE 2

Exemplary Fuel-Air-Ratio for Cruise Thrust and Various Flow Divisions

| Operating Mode And Flow Division To Boost Spool 12 | Load Compressor Flow = High | | Load Compressor Flow = Low | |
|---|---|---|---|---|
| k = 0.9 | j = 0.1 | | j = 0.9 | |
| FAR Boost Spool | 0.010 | 0.050 | 0.010 | 0.050 |
| FAR Ingress | 0.001 | 0.005 | 0.009 | 0.045 |
| FAR Primary Combustor Exit | 0.014 | 0.046 | 0.014 | 0.046 |
| FAR Primary Combustor Exit Excluding Secondary Combustor Fuel Flow | 0.005 | 0.001 | 0.005 | 0.001 |

TABLE 3

Exemplary Fuel-Air-Ratio for High Engine Thrust (e.g. Climb and Takeoff) and Various Flow Divisions

| Operating Mode And Flow Division To Boost Spool 12 | Load Compressor Flow = High | | Load Compressor Flow = Low | |
|---|---|---|---|---|
| k = 0.9 | j = 0.1 | | j = 0.9 | |
| FAR Boost Spool | 0.010 | 0.050 | 0.010 | 0.050 |
| FAR Ingress | 0.001 | 0.005 | 0.009 | 0.045 |
| FAR Primary Combustor Exit | 0.029 | 0.061 | 0.029 | 0.061 |
| FAR Primary Combustor Exit Excluding Secondary Combustor Fuel Flow | 0.020 | 0.016 | 0.020 | 0.016 |

DISCUSSION OF POSSIBLE EMBODIMENTS

The following are non-exclusive descriptions of possible embodiments of the present invention.

A gas turbine engine according to an exemplary embodiment of this disclosure includes, among other possible things, a first spool and a second spool. The first spool includes a first compressor and a first turbine mounted to a first shaft. The second spool includes a second compressor, a second turbine, and a load compressor mounted to a second shaft. The gas turbine engine includes an inlet plenum fluidly connected to the second compressor and the load compressor.

The gas turbine engine of the preceding paragraph can optionally include, additionally and/or alternatively, any one or more of the following features, configurations and/or additional components.

A further embodiment of the foregoing gas turbine engine can include a primary combustor disposed between the first compressor and the first turbine.

A further embodiment of any of the foregoing gas turbine engines can include a secondary combustor disposed between the second compressor and the second turbine.

A further embodiment of any of the foregoing gas turbine engines can include a diffuser disposed between the primary combustor and the first compressor.

A further embodiment of any of the foregoing gas turbine engines can include an inlet duct assembly extending between and fluidly connecting the diffuser to the inlet plenum.

A further embodiment of any of the foregoing gas turbine engines can include an outlet duct assembly extending between and fluidly connecting the first turbine and the load compressor to the diffuser.

A further embodiment of any of the foregoing gas turbine engines can include a primary flow path.

A further embodiment of any of the foregoing gas turbine engines can include a secondary flow path.

A further embodiment of any of the foregoing gas turbine engines can include a tertiary flow path.

A further embodiment of any of the foregoing gas turbine engines, wherein the primary flow path can include the first compressor and the first turbine.

A further embodiment of any of the foregoing gas turbine engines, wherein the primary flow path can include the primary combustor.

A further embodiment of any of the foregoing gas turbine engines, wherein the primary flow path can include the diffuser.

A further embodiment of any of the foregoing gas turbine engines, wherein the primary flow path of the gas turbine engine includes, in flow series, the first compressor the diffuser, the primary combustor, and the first turbine.

A further embodiment of any of the foregoing gas turbine engines, wherein the secondary flow path can include the second compressor and the second turbine.

A further embodiment of any of the foregoing gas turbine engines, wherein the secondary flow path can include the secondary combustor.

A further embodiment of any of the foregoing gas turbine engines, wherein the secondary combustor can include the inlet plenum.

A further embodiment of any of the foregoing gas turbine engines, wherein the secondary flow path of the gas turbine engine can include, in flow series, the inlet plenum, the second compressor, the secondary combustor, and the second turbine.

A further embodiment of any of the foregoing gas turbine engines, wherein the tertiary flow path can include the load compressor.

A further embodiment of any of the foregoing gas turbine engines, wherein the tertiary flow path can include, in flow series, the inlet plenum and the load compressor.

A further embodiment of any of the foregoing gas turbine engines can include a first variable inlet guide vane stage disposed along the secondary flow path between the inlet plenum and the second compressor.

A further embodiment of any of the foregoing gas turbine engines, wherein the first variable inlet guide vane stage can include a plurality of first vanes spaced circumferentially about the second shaft and rotatable about respective first vane axes to vary a first open area of the first variable inlet guide vane stage.

A further embodiment of any of the foregoing gas turbine engines can include a second variable inlet guide vane stage disposed along the tertiary flow path between the inlet plenum and the load compressor.

A further embodiment of any of the foregoing gas turbine engines, wherein the second variable inlet guide vane stage can include a plurality of second vanes spaced circumferentially about the second shaft and rotatable about respective second vane axes to vary a second open area of the second variable inlet guide vane stage.

A further embodiment of any of the foregoing gas turbine engines can include an electric machine rotatably coupled to the second shaft.

A further embodiment of any of the foregoing gas turbine engines can include an electric machine mounted to the second shaft.

A further embodiment of any of the foregoing gas turbine engines can include a plurality of first diffuser ducts extending from the first compressor to the inlet duct assembly.

A further embodiment of any of the foregoing gas turbine engines can include a plurality of second diffuser ducts extending from the first compressor to the primary combustor.

A further embodiment of any of the foregoing gas turbine engines, wherein the plurality of first diffuser ducts and the plurality of second diffuser ducts are circumferentially spaced about the first compressor.

A further embodiment of any of the foregoing gas turbine engines, wherein the plurality of first diffuser ducts is interposed between the plurality of second diffuser ducts.

A further embodiment of any of the foregoing gas turbine engines, wherein the inlet duct assembly can include an inlet manifold.

A further embodiment of any of the foregoing gas turbine engines wherein the inlet duct assembly can include an inlet duct extending from the inlet manifold to the inlet plenum.

A further embodiment of any of the foregoing gas turbine engines, wherein the plurality of first diffuser ducts can extend from the first compressor to the inlet manifold.

A further embodiment of any of the foregoing gas turbine engines, wherein the outlet duct assembly can include a first outlet manifold. \

A further embodiment of any of the foregoing gas turbine engines, wherein the outlet duct assembly can include a plurality of first outlet ducts extending from the outlet manifold to the diffuser.

A further embodiment of any of the foregoing gas turbine engines, wherein the outlet duct assembly can include a second outlet manifold.

A further embodiment of any of the foregoing gas turbine engines, wherein the outlet duct assembly can include a plurality of second outlet ducts extending from the second outlet manifold to the diffuser.

A further embodiment of any of the foregoing gas turbine engines, wherein the plurality of first outlet ducts and the plurality of second outlet ducts can be circumferentially spaced about the first shaft upstream from the primary combustor.

A further embodiment of any of the foregoing gas turbine engines, wherein the plurality of first outlet ducts can be interposed with the plurality of second outlet ducts upstream from the diffuser.

A further embodiment of any of the foregoing gas turbine engines, wherein the plurality of first outlet ducts and the plurality of second outlet ducts are radially outward from the plurality of first diffuser ducts.

A further embodiment of any of the foregoing gas turbine engines, wherein the plurality of first outlet ducts, the plurality of second outlet ducts, and the plurality of first diffuser ducts can extending to the primary combustor.

A further embodiment of any of the foregoing gas turbine engines, wherein the outlet duct assembly can include an ejector.

A further embodiment of any of the foregoing gas turbine engines, wherein the ejector can include a nozzle centrally disposed within the ejector.

A further embodiment of any of the foregoing gas turbine engines, wherein the ejector can include a first inlet communicating with the nozzle.

A further embodiment of any of the foregoing gas turbine engines, wherein the ejector can include a second inlet communicating with an annular region circumscribing the nozzle.

A further embodiment of any of the foregoing gas turbine engines, wherein the ejector can include an outlet communicating with the first inlet and the second inlet of the ejector.

A further embodiment of any of the foregoing gas turbine engines, wherein the outlet duct assembly can include a first duct extending between and fluidly connecting the load compressor to the first inlet of the ejector.

A further embodiment of any of the foregoing gas turbine engines, wherein the outlet duct assembly can include a second duct extending between and fluidly connecting the first turbine to the second inlet of the ejector.

A further embodiment of any of the foregoing gas turbine engines, wherein the outlet duct assembly can include an outlet manifold and a third duct extending between and fluidly connecting the outlet of the ejector to the outlet manifold.

A further embodiment of any of the foregoing gas turbine engines, wherein the outlet duct assembly can include a plurality of fourth ducts extending from the outlet manifold to the diffuser.

A further embodiment of any of the foregoing gas turbine engines can include a controller.

A further embodiment of any of the foregoing gas turbine engines, where the controller can include a processor and memory.

A further embodiment of any of the foregoing gas turbine engines, wherein the memory of the controller can be encoded with instructions that, when executed by the processor, cause the gas turbine engine to vary a first open area of the first variable inlet guide vane stage based on an engine pressure ratio of the second spool.

A further embodiment of any of the foregoing gas turbine engines, wherein the engine pressure ratio can be equal to a first pressure measured within the outlet duct assembly divided by a second pressure measured within the inlet duct assembly.

A further embodiment of any of the foregoing gas turbine engines, wherein the first pressure can be representative of an outlet pressure of the second turbine.

A further embodiment of any of the foregoing gas turbine engines, wherein the memory of the controller can be encoded with instructions that, when executed by the processor, cause the gas turbine engine to vary a second open area of the second variable inlet guide vane stage based on a pressure difference between the first pressure and a third pressure measured within the outlet duct assembly.

A further embodiment of any of the foregoing gas turbine engines, wherein the third pressure can be representative of an outlet pressure of the load compressor.

A further embodiment of any of the foregoing gas turbine engines, wherein the third pressure can be at least ten percent greater than the first pressure.

A further embodiment of any of the foregoing gas turbine engines, wherein the memory of the controller can be encoded with instructions that, when executed by the processor, cause the gas turbine engine to deliver a first fuel flow rate to the primary combustor.

A further embodiment of any of the foregoing gas turbine engines, wherein the memory of the controller can be encoded with instructions that, when executed by the processor, cause the gas turbine engine to deliver a second fuel flow rate to the secondary combustor.

A further embodiment of any of the foregoing gas turbine engines, wherein a fuel-air-ratio measured between the primary combustor and the first turbine can be less than 0.01.

A further embodiment of any of the foregoing gas turbine engines, wherein the fuel-air-ratio can be greater than or equal to 0.001 and less than or equal to 0.005.

A further embodiment of any of the foregoing gas turbine engines, wherein the engine pressure ratio can be greater than or equal to 0.67.

A further embodiment of any of the foregoing gas turbine engines, wherein the engine pressure ratio can be less than or equal to 0.85.

A further embodiment of any of the foregoing gas turbine engines can include a first electric machine rotationally coupled to the second shaft.

A further embodiment of any of the foregoing gas turbine engines, wherein the first electric machine can be mounted to the second shaft.

A further embodiment of any of the foregoing gas turbine engines can include a second electric machine rotationally coupled to the first shaft.

A further embodiment of any of the foregoing gas turbine engines, wherein the second electric machine can be mounted to the first shaft.

A further embodiment of any of the foregoing gas turbine engines, wherein the memory of the controller can be encoded with instructions that, when executed by the processor, cause the gas turbine engine to deliver electric power produced by the first electric machine to the second electric machine to thereby drive the second electric machine and the first shaft in rotation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A gas turbine engine comprising:
    a first spool comprising a first compressor and a first turbine mounted to a first shaft;
    a primary combustor disposed between the first compressor and the first turbine;
    a diffuser disposed between the primary combustor and the first compressor, wherein a primary flow path of the gas turbine engine includes, in flow series, the first compressor, the diffuser, the primary combustor, and a first turbine;
    a second spool comprising a second compressor, a second turbine, and a load compressor mounted to a second shaft;
    an inlet plenum fluidly connected to the second compressor and the load compressor;
    a secondary combustor disposed between the second compressor and the second turbine, wherein a secondary flow path of the gas turbine engine includes, in flow series, the inlet plenum, the second compressor, the secondary combustor, and the second turbine, and wherein a tertiary flow path of the gas turbine engine includes, in flow series, the inlet plenum and the load compressor;
    an inlet duct assembly extending between and fluidly connecting the diffuser to the inlet plenum;
    an outlet duct assembly extending between and fluidly connecting the first turbine and the load compressor to the diffuser.

2. The gas turbine engine of claim 1, further comprising:
    a first variable inlet guide vane stage disposed along the secondary flow path between the inlet plenum and the second compressor, the first variable inlet guide vane stage comprising a plurality of first vanes spaced circumferentially about the second shaft and rotatable about respective first vane axes to vary a first open area of the first variable inlet guide vane stage.

3. The gas turbine engine of claim 2, further comprising:
    a second variable inlet guide vane stage disposed along the tertiary flow path between the inlet plenum and the load compressor, the second variable inlet guide vane stage comprising a plurality of second vanes spaced circumferentially about the second shaft and rotatable about respective second vane axes to vary a second open area of the second variable inlet guide vane stage.

4. The gas turbine engine of claim 1, further comprising:
    an electric machine mounted to the second shaft.

5. The gas turbine engine of claim 1, wherein the diffuser comprises:
    a plurality of first diffuser ducts extending from the first compressor to the inlet duct assembly; and
    a plurality of second diffuser ducts extending from the first compressor to the primary combustor.

6. The gas turbine engine of claim 5, wherein the plurality of first diffuser ducts and the plurality of second diffuser ducts are circumferentially spaced about the first compressor, and wherein the plurality of first diffuser ducts is interposed between the plurality of second diffuser ducts.

7. The gas turbine engine of claim 6, wherein the inlet duct assembly comprises an inlet manifold and an inlet duct extends from the inlet manifold to the inlet plenum, and wherein the plurality of first diffuser ducts extends from the first compressor to the inlet manifold.

8. The gas turbine engine of claim 5, wherein the outlet duct assembly comprises a first outlet manifold and a plurality of first outlet ducts extending from the first outlet manifold to the diffuser, and wherein the outlet duct assembly comprises a second outlet manifold and a plurality of second outlet ducts extending from the second outlet manifold to the diffuser.

9. The gas turbine engine of claim 8, wherein the plurality of first outlet ducts and the plurality of second outlet ducts are circumferentially spaced about the first shaft upstream from the primary combustor, and wherein each of the plurality of first outlet ducts are interposed with the plurality of second outlet ducts upstream from the diffuser.

10. The gas turbine engine of claim 9, wherein the plurality of first outlet ducts and the plurality of second outlet ducts are radially outward from the plurality of first diffuser ducts, and wherein the plurality of first outlet ducts, the plurality of second outlet ducts, and the plurality of first diffuser ducts extend into the primary combustor.

11. The gas turbine engine of claim 1, wherein the outlet duct assembly includes:
    an ejector comprising:
        a nozzle centrally disposed within the ejector;
        a first inlet communicating with the nozzle;
        a second inlet communicating with an annular region circumscribing the nozzle; and
        an outlet communicating with the first inlet and the second inlet;
    a first duct extending between and fluidly connecting the load compressor to the first inlet of the ejector;
    a second duct extending between and fluidly connecting the first turbine to the second inlet of the ejector.

12. The gas turbine engine of claim 11, wherein the outlet duct assembly includes:
    an outlet manifold;
    a third duct extending between and fluidly connecting the outlet of the ejector to the outlet manifold; and
    a plurality of fourth ducts extending from the outlet manifold to the diffuser.

13. A gas turbine engine comprising:
    a first spool comprising a first compressor and a first turbine mounted to a first shaft;
        a diffuser disposed downstream of the first compressor; wherein a primary flow path includes the first compressor, the diffuser and the first turbine;
        a second spool comprising a second compressor, a second turbine, and a load compressor mounted to a second shaft eccentric to the first shaft;

an inlet plenum fluidly connected to the second compressor and the load compressor,
wherein a secondary flow path includes the inlet plenum, the second compressor and the second turbine, and wherein a tertiary flow path includes the inlet plenum and the load compressor;
a first variable inlet guide vane stage disposed along the secondary flow path between the inlet plenum and the second compressor;
a second variable inlet guide vane stage disposed along the tertiary flow path between the inlet plenum and the load compressor;
an inlet duct assembly extending between and fluidly connecting the diffuser to the inlet plenum;
an outlet duct assembly extending between and fluidly connecting the first turbine and the load compressor to the diffuser; and
a controller comprising a processor and memory encoded with instructions that, when executed by the processor, cause the gas turbine engine to:
vary a first open area of the first variable inlet guide vane stage based on an engine pressure ratio of the second spool, wherein the engine pressure ratio is equal to a first pressure measured within the outlet duct assembly divided by a second pressure measured within the inlet duct assembly, and wherein the first pressure is representative of an outlet pressure of the second turbine; and
vary a second open area of the second variable inlet guide vane stage based on a pressure difference between the first pressure and a third pressure measured within the outlet duct assembly and is representative of an outlet pressure of the load compressor.

14. The gas turbine engine of claim 13, wherein the third pressure is at least ten percent greater than the first pressure.

15. The gas turbine engine of claim 13, further comprising:
a primary combustor disposed along the primary flow path between the first compressor and the first turbine; and
a secondary combustor disposed along the secondary flow path between the second compressor and the second turbine;
wherein the memory of the controller is encoded with instructions that, when executed by the processor, cause the gas turbine engine to:
deliver a first fuel flow rate to the primary combustor; and
deliver a second fuel flow rate to the secondary combustor; and
wherein a fuel-air-ratio measured between the primary combustor and the first turbine is less than 0.01.

16. The gas turbine engine of claim 15, wherein the fuel-air-ratio is greater than or equal to 0.001 and less than or equal to 0.005.

17. The gas turbine engine of claim 13, wherein the engine pressure ratio is greater than or equal to 0.67.

18. The gas turbine engine of claim 17, wherein the engine pressure ratio is less than or equal to 0.85.

19. The gas turbine engine of claim 13, further comprising:
a first electric machine rotationally coupled to the second shaft; and
a second electric machine rotationally coupled to the first shaft;
wherein the memory of the controller is encoded with instructions that, when executed by the processor, cause the gas turbine engine to:
deliver electric power produced by the first electric machine to the second electric machine to thereby drive the second electric machine and the first shaft in rotation.

20. A gas turbine engine comprising:
a first spool comprising a first compressor and a first turbine mounted to a first shaft;
a diffuser disposed downstream of the first compressor;
wherein a primary flow path includes the first compressor, the diffuser and the first turbine;
a second spool comprising a second compressor, a second turbine, and a load compressor mounted to a second shaft eccentric to the first shaft;
an inlet plenum fluidly connected to the second compressor and the load compressor, wherein a secondary flow path includes the inlet plenum, the second compressor and the second turbine, and wherein a tertiary flow path includes the inlet plenum and the load compressor;
a first variable inlet guide vane stage disposed along the secondary flow path between the inlet plenum and the second compressor;
a second variable inlet guide vane stage disposed along the tertiary flow path between the inlet plenum and the load compressor;
an inlet duct assembly extending between and fluidly connecting the diffuser to the inlet plenum;
an outlet duct assembly extending between and fluidly connecting the first turbine and the load compressor to the diffuser; and
a controller comprising a processor and memory encoded with instructions that, when executed by the processor, cause the gas turbine engine to:
vary a first open area of the first variable inlet guide vane stage based on an engine pressure ratio of the second spool, wherein the engine pressure ratio is equal to a first pressure measured within the outlet duct assembly divided by a second pressure measured within the inlet duct assembly, and wherein the first pressure is representative of an outlet pressure of the second turbine, and wherein the engine pressure ratio is greater than or equal to 0.67 and less than or equal to 0.85; and
vary a second open area of the second variable inlet guide vane stage based on a pressure difference between the first pressure and a third pressure measured within the outlet duct assembly and is representative of an outlet pressure of the load compressor, wherein the third pressure is at least ten percent greater than the first pressure.

* * * * *